(No Model.)
R. S. PENNIMAN.
PREPARING NITRATE OF AMMONIA.
No. 448,362. Patented Mar. 17, 1891.
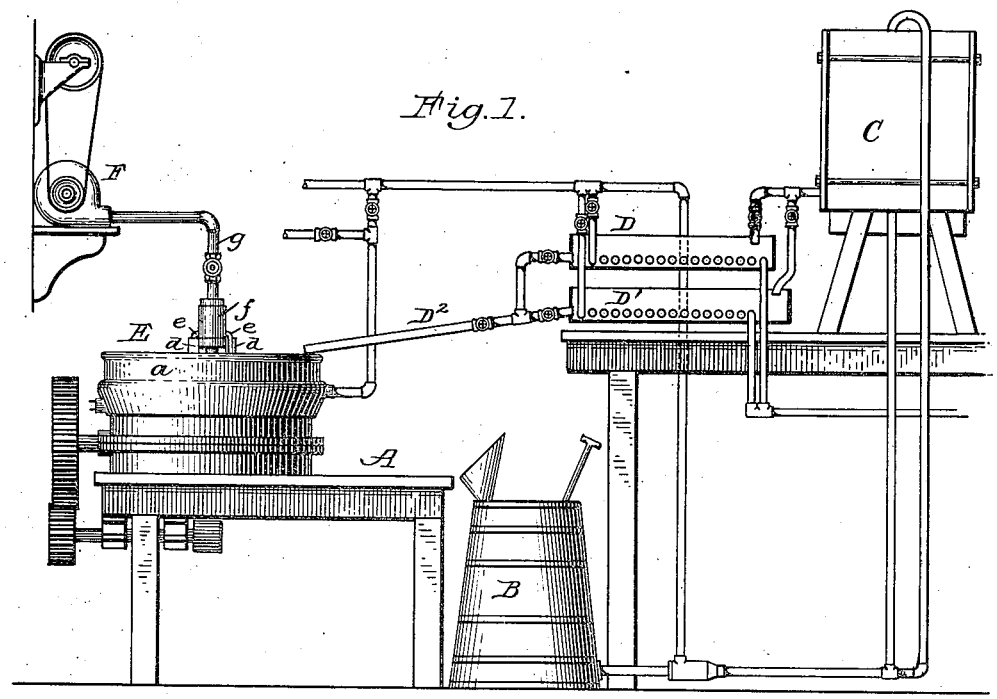
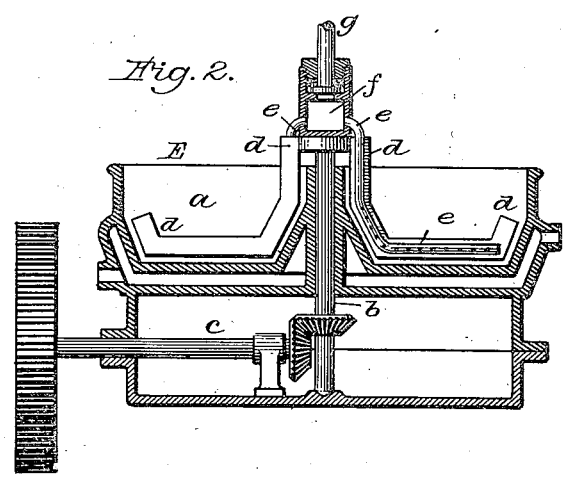
Attest:
Philip F. Larner
Howell Bartle
Inventor:
Russell S. Penniman
By
Attorney

UNITED STATES PATENT OFFICE.

RUSSELL S. PENNIMAN, OF DOVER, NEW JERSEY.

PREPARING NITRATE OF AMMONIA.

SPECIFICATION forming part of Letters Patent No. 448,362, dated March 17, 1891.

Original application filed July 11, 1888, Serial No. 279,649. Divided and this application filed August 20, 1890. Serial No. 362,483. (No model.)

*To all whom it may concern:*

Be it known that I, RUSSELL S. PENNIMAN, of Dover, in the county of Morris and State of New Jersey, have invented certain new and useful Improvements in the Manufacture of Nitrate of Ammonia; and I do hereby declare that the following specification, taken in connection with the drawings furnished and forming a part of the same, is a clear, true, and complete description of my said invention.

In my application for Letters Patent filed July 11, 1888, Serial No. 279,649, I disclosed certain improvements in the manufacture of nitrate of ammonia, including the production of the same in a protected form for use in high explosives, and my present application is founded upon said prior application and is intended to be a division thereof. In my said prior application I described the development of dehydrated grained nitrate of ammonia in the presence of a protecting medium, and also the development of the grained nitrate without the presence of said medium, but affording it in a novel condition as to graining and dehydration fit for and ready to receive a protecting-coating, and it is to this latter mode of operation in the production of protected nitrate that my present application is to be restricted.

After describing this portion of my invention, in connection with the accompanying drawings, the same will be duly specified in an appropriate claim hereunto annexed.

Referring to the drawings, Figure 1 illustrates in elevation an apparatus as devised by me for use in accordance with my invention. Fig. 2 illustrates in central vertical section the portion of the apparatus in which the dehydrated grained nitrate is developed.

The requisite acids and ammoniacal liquors are assembled upon a suitable platform A, and the finished product is taken from the apparatus into suitable receptacles, also to be supported on said platform. A mixing-tank B is located on a floor below the platform, so that the top of the tank will be easily accessible for the reception of the acid and ammoniacal liquor from the platform. This mixing-tank has a cover and also a funnel for facilitating the delivery of the charge thereto, and it should be provided with a stirrer, however operated. Said tank is coupled to each of a series of settling-tanks C, upon trestles resting on a second upper platform by means of pipes provided with a steam-ejector or with a suitable pump to enable the transfer of the contents of the mixing-tank to the settling-tanks. On the upper platform there is a set of concentrating-pans, and although but two are shown at D D', one being above the other, it is to be understood that a series of such pans should be used. These pans are provided with coils for the reception of steam, and they are also connected by piping provided with suitable cocks, which enable either to be discharged by way of pipe $D^2$, or the contents of the upper pan to flow to the lower, although each pan may be separately supplied with brine from the settling-tanks.

The graining and coating apparatus E is conveniently accessible from the platform on which it stands, and it consists of a circular jacketed pan $a$, provided with a central hub containing a vertical shaft $b$, geared to a driving-shaft $c$. The upper end of said shaft $b$ supports a set of pendent arms or stirrers $d$, which occupy the pan, and when rotated they serve as mechanical stirrers. One or more of said arms $d$ carry bent perforated pipes $e$, which at their upper ends communicate with a chamber $f$, to which air is supplied under sufficient pressure, by way of a pipe $g$, communicating with a blower F or other suitable air-pump.

In the practice of the invention which is the subject hereof the tank B is charged with aqueous ammoniacal liquor and nitric acid, the latter in such quantity as will leave the mass slightly alkaline and then properly stirred. The brine is then transferred to the settling-tank, from which it is in due time delivered in proper quantities to the concentrating-pans D D', within which the process of evaporation is quite rapidly conducted until from ninety to ninety-five per cent. of the water has been expelled. From these pans the liquid is then delivered in desirable quantities to the graining apparatus E, and while therein and at a high temperature (steam being admitted to the interior steam-space) jets of air are delivered into the liquefied nitrate, thus not only preventing all danger of decomposition due to high heat, but also carrying off all of the water and thoroughly dehydrating the nitrate while it is in a liquefied or melted condition. The air is then cut off, and the steam is also cut off from entering the jacket-space of the pan, and then cold water is introduced into said space for cooling down the mass, the stirrers being kept in motion until the nitrate is well grained, whereupon the protecting medium (such as vaseline or other suitable coating material) is introduced, the grains of nitrate readily taking to their surfaces enough of the coating to enable them to resist those deliquescent tendencies common to unprotected nitrate. Care should be taken to avoid a temperature higher than 320°, and the proportion of the coating need be no greater than, say, thirteen per cent. of the weight of the nitrate to be protected.

Having thus described this portion of my invention, I claim as new and desire to secure under this application—

The improvement in the process of manufacturing protected nitrate of ammonia, which consists in dehydrating the nitrate while it is in a liquefied or melted condition by mechanical agitation, accompanied with the injection of air, then cooling the nitrate and developing it into grains by mechanical agitation while cooling, and then applying to the mass a medium for protecting the grains of nitrate against deliquescent tendencies.

RUSSELL S. PENNIMAN

Witnesses:
J. T. CORLEW,
SYDNEY S. SMITH.